United States Patent
Mayfield et al.

(10) Patent No.: US 7,574,593 B2
(45) Date of Patent: Aug. 11, 2009

(54) PERSISTENT MEMORY MANIPULATION USING EFI

(75) Inventors: John Brian Mayfield, Windsor, CO (US); Kenneth John Geer, Auburn, CA (US); Chris Deon Hyser, Victor, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 617 days.

(21) Appl. No.: 11/004,355

(22) Filed: Dec. 3, 2004

(65) Prior Publication Data
US 2006/0123223 A1    Jun. 8, 2006

(51) Int. Cl.
*G06F 9/00* (2006.01)
(52) U.S. Cl. .............................. 713/100; 713/1; 713/2
(58) Field of Classification Search ............. 713/1, 713/2, 100
See application file for complete search history.

(56) References Cited

U.S. PATENT DOCUMENTS

| | | | |
|---|---|---|---|
| 6,360,362 B1 | 3/2002 | Fichtner et al. | |
| 6,732,267 B1 * | 5/2004 | Wu et al. | 713/100 |
| 6,751,681 B2 | 6/2004 | Torii et al. | |
| 6,754,895 B1 | 6/2004 | Bartel et al. | |
| 7,082,523 B2 * | 7/2006 | Zimmer et al. | 713/1 |
| 7,143,275 B2 * | 11/2006 | Cepulis et al. | 713/1 |
| 7,281,124 B2 * | 10/2007 | Rothman et al. | 713/1 |
| 2002/0091807 A1 | 7/2002 | Goodman | |
| 2002/0194582 A1 | 12/2002 | Torii et al. | |
| 2004/0236936 A1 * | 11/2004 | Bulusu et al. | 713/2 |
| 2005/0144428 A1 * | 6/2005 | Rothman et al. | 713/1 |

* cited by examiner

*Primary Examiner*—Chun Cao

(57) ABSTRACT

Systems, methodologies, media, and other embodiments associated with performing a manipulation of a persistent memory using an extensible firmware interface are described. One exemplary method embodiment includes selectively refreshing a persistent memory from an EFI level application and providing to a user level application a signal concerning the persistent memory refreshing.

27 Claims, 13 Drawing Sheets

PERSISTENT MEMORY MANIPULATION USING EFI

BACKGROUND

FIG. 1 illustrates a typical computing system 100 that includes a BIOS (Basic Input Output System) 110, a CPU (Central Processing Unit) 120, and a disk 130. When BIOS 110 receives a signal like a START signal, it may be tasked with booting the computing system 100. Booting the computing system 100 may include locating an operating system on disk 130 and beginning its execution on CPU 120. Additionally, booting the computing system 100 may include various pre-boot activities like locating hardware (e.g., disk 130), locating software (e.g., operating system loader), performing various diagnostics (e.g., checking memory), and so on.

At one point in time, system 100 may have included a BIOS 110 stored in a ROM (Read Only Memory). In this example, changing the BIOS 110 (e.g., installing new version), may have involved manually removing the ROM in which the BIOS 110 was stored and installing a new ROM. This required some technical skill and required the system 100 to be turned off and on.

At a later point in time, system 100 may have included a BIOS 110 stored in an EEPROM (Electrically Erasable Programmable ROM). An EEPROM is a type of PROM (Programmable ROM) that can be erased by exposing it to an electrical charge. The PROM may then be reprogrammed. Like other ROMs, an EEPROM may retain its contents when power to a system is turned off, which makes it suitable for storing a BIOS. In this example, changing the BIOS 110 may have included electrically erasing the PROM in which the BIOS 110 was stored and reprogramming it. In one example, this may have involved removing the PROM and reburning it. In another example, this may have involved reprogramming the PROM without removing it from system 100. However, reprogramming a PROM may have included writing the PROM byte-by-byte, which could be a time-consuming process. Even in an EEPROM based system, changing a BIOS 110 may have required technical skill and may have required a system to be turned off and on manually.

Recently is has become popular to store a BIOS associated with a computing system in a flash memory. Flash memory is a type of EEPROM that can be erased and reprogrammed in block sized amounts rather than byte by byte, thus making it typically faster to reprogram than a traditional EEPROM. When a BIOS is stored in a flash memory, it may be referred to as a flash BIOS. Also recently, in attempts to update boot processing, an interface between operating systems and platform firmware has developed. One example interface is the EFI (Extensible Firmware Interface), which includes, for example, data tables containing platform related information, boot services, runtimes services available to an operating system, an operating system loader, and so on. The EFI attempts to provide a standard environment for booting an operating system and/or running pre-boot applications.

FIG. 2 illustrates a high level diagram of a system 200 that is configured with an EFI 220. A BIOS 230 may logically reside between an operating system loader 210 and a set of hardware 240. The EFI 220 may facilitate interfacing the operating system loader 210 and the BIOS 230. In some examples, the EFI 220 may include an EFI shell through which skilled technicians may perform certain tasks, like reprogramming BIOS 230 with new system firmware. This reprogramming may require a user to take actions including, for example, starting the EFI shell, locating and mounting an EFI partition, copying files (e.g., binary input file, configuration file) to the newly mounted EFI partition, restarting the system and restarting the EFI shell, locating and entering a folder into which the files were copied, running an EFI shell level utility and providing it with arguments, following a set of instructions provided by the utility, restarting the system again, and verifying that the update completed in a desired fashion. This conventional approach may tax the technical know how and patience of a typical PC user.

BRIEF DESCRIPTION OF THE DRAWING

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
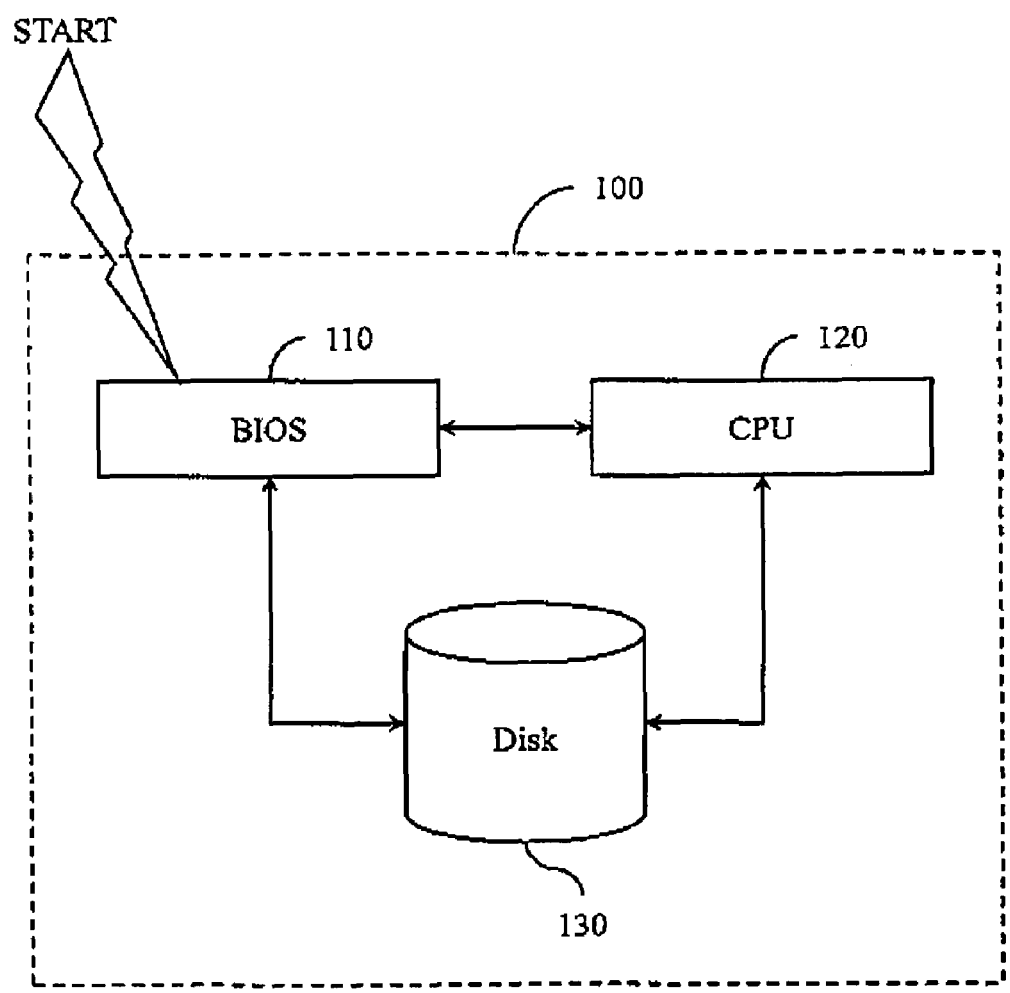
FIG. 1 illustrates an example computing system configured with a BIOS.
Figure 2:
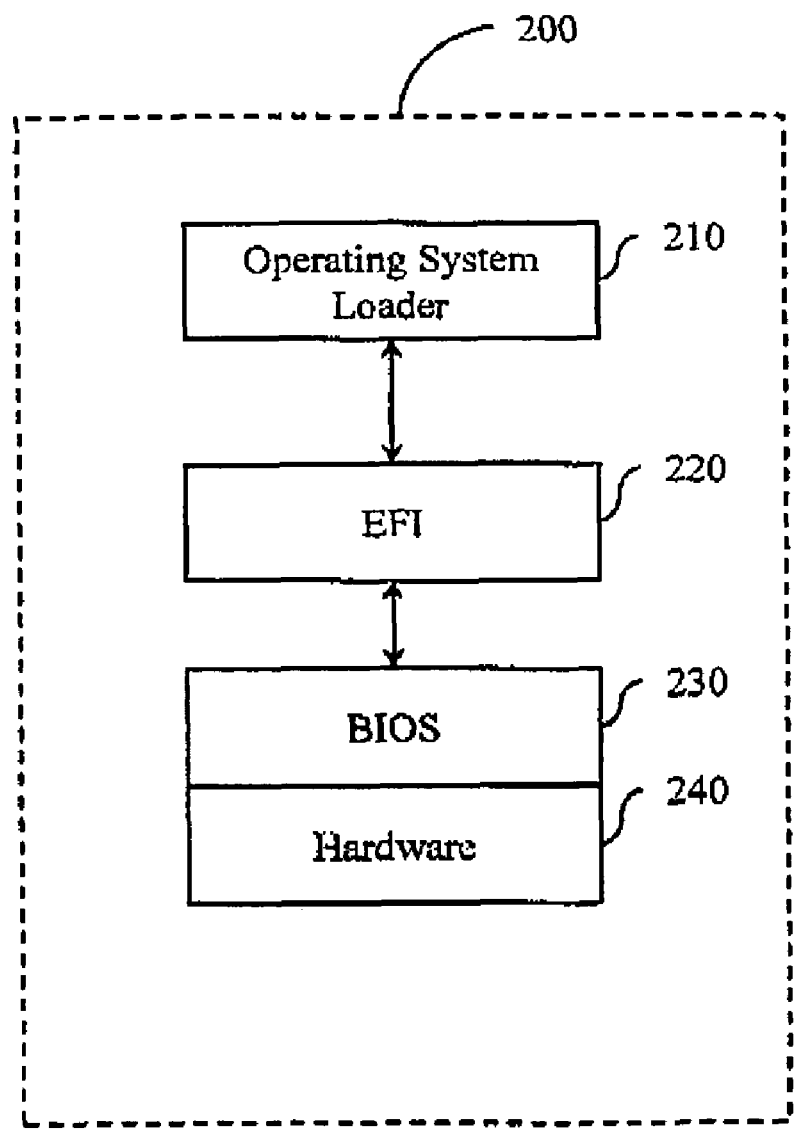
FIG. 2 illustrates an example system configured with an EFI.

Example systems and methods described herein concern refreshing system firmware stored in a reprogrammable persistent memory. The refreshing may be initiated by a user level process that interacts with a firmware interface like EFI. The system firmware may be, for example, a BIOS and may be stored in a persistent memory like a flash memory. The persistent memory may be stored, for example, on a motherboard, a cell board, a node board, and so on. The user level process and firmware interface may interact, for example, by communicating parameters, error codes, and so on, through firmware interface variables (e.g., EFI variables) that are visible to both user level processes and EFI level processes.

Rather than manually removing a chip in which a BIOS is stored, or invoking an EFI shell and performing various technical tasks, a user may initiate a firmware refresh from a user level application. The user level application may be tasked, for example, with examining a current firmware associated with the system, determining whether a different (e.g., improved, more recent) firmware is available for the system, and communicating firmware refresh data to an EFI level application. The user level application may invoke an EFI level application that can reconfigure the EFI by, for example, establishing an update tool as an application to be run by a booting EFI. The update tool may include and/or be configured to locate the firmware with which the reprogrammable persistent memory is to be refreshed. Pre-boot actions taken by the EFI may, therefore, locate and run the update tool, which in turn will attempt to reprogram the persistent memory with the desired firmware. Success or failure can be reported back to the user application through EFI variables.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11, IEEE 802.15), an Ethernet system (e.g., IEEE 802.3), a token ring system (e.g., IEEE 802.5), a local area network (LAN), a wide area network (WAN), a point-to-point system, a circuit switching system, a packet switching system, combinations thereof, and so on.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks, and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically and/or statically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be produced using programming languages and tools like Java, Pascal, C#, C++, C, CGI, Perl, SQL, APIS, SDKS, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Figure 3:
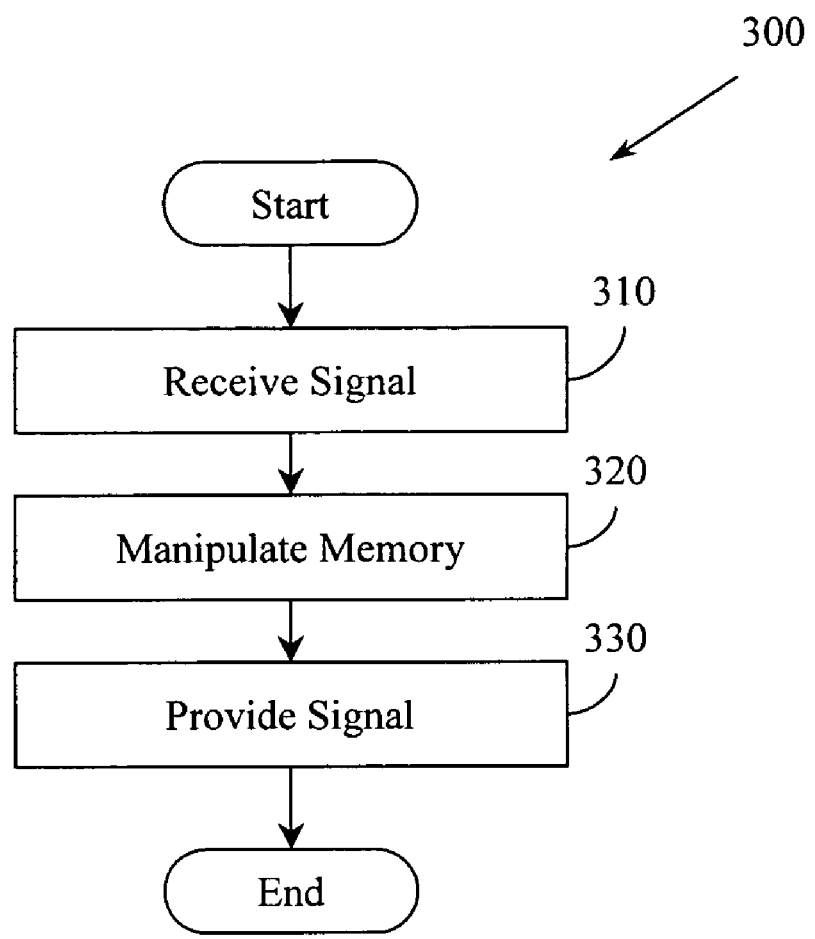
FIG. 3 illustrates an example method associated with manipulating a persistent memory.
Figure 7:
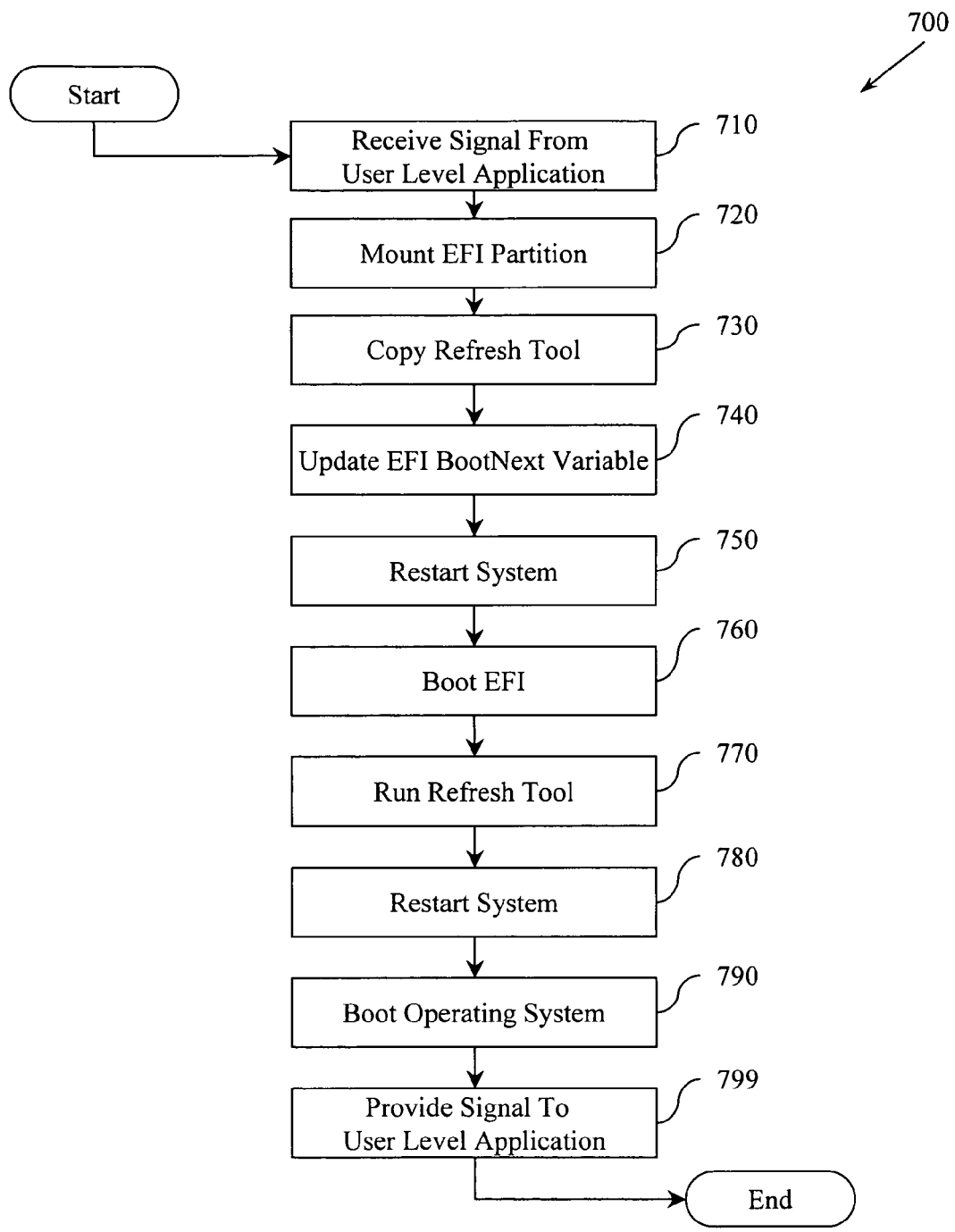
FIG. 7 illustrates an example method associated with manipulating a persistent memory.
Figure 8:
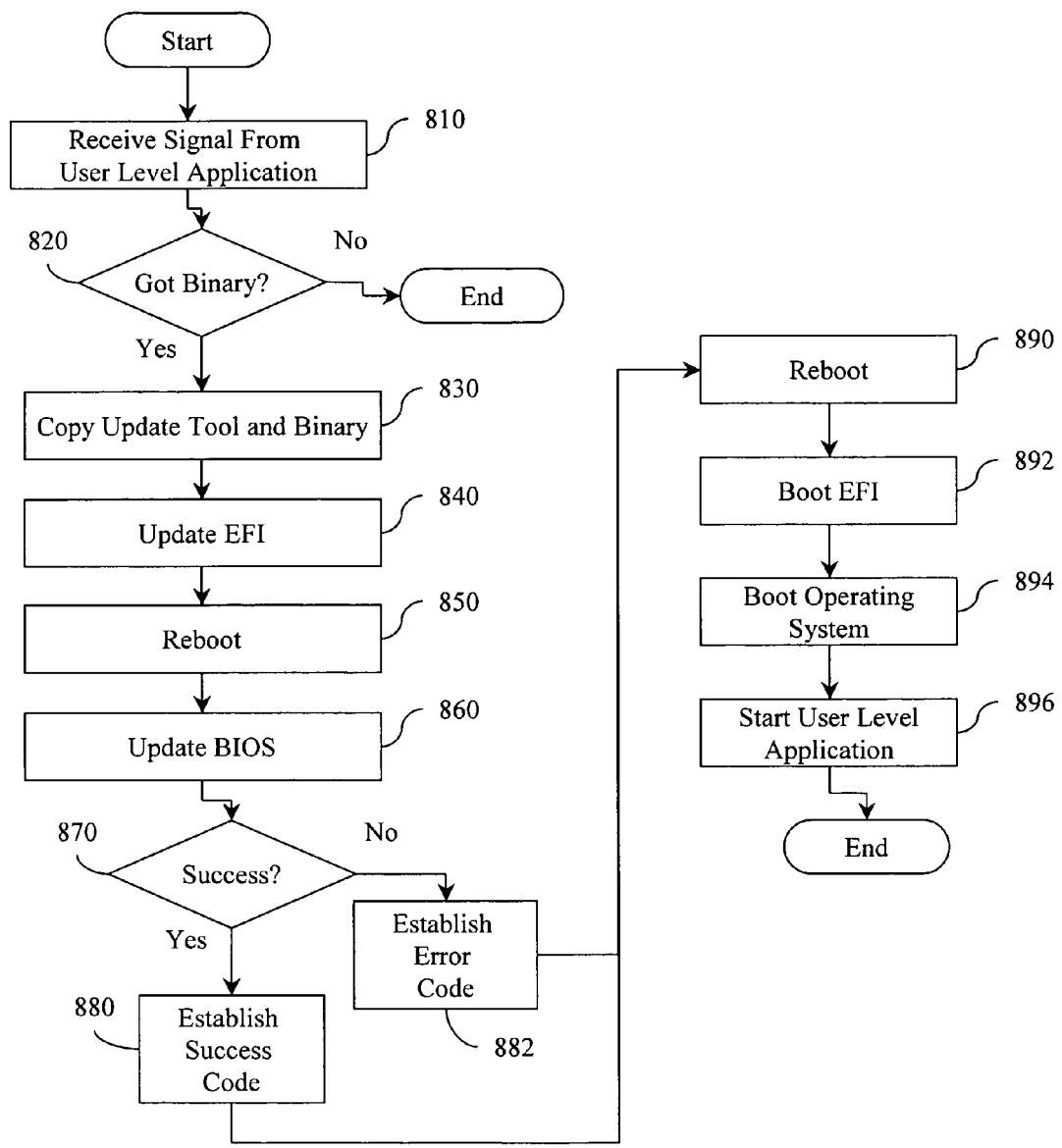
FIG. 8 illustrates an example method associated with reflashing system firmware from an administrative level in an operating system.

Example methods may be better appreciated with reference to the flow diagrams of FIGS. 3, 7 and 8. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. The processing blocks may represent a method step and/or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

FIG. 3 illustrates an example method 300 associated with manipulating a persistent memory. As used herein, a "persistent memory" refers to an integrated circuit like an electrically erasable programmable read only memory (EEPROM), a flash memory, and so on. A persistent memory may be configured to store a system firmware like a BIOS that may participate in booting a computing system. Thus, the example systems and methods may concern manipulating a memory chip in a computing system. "Manipulating a memory chip", as used herein, refers to talking actions like erasing, editing, replacing, and so on the code (firmware) stored in a persistent memory like a memory chip.

Thus, method 300 may include, at 310, receiving a first signal in an extensible firmware interface (EFI) level logic configured to operate at a pre-boot time without operating system support. A computing system may have executables that are configured to operate at various logical levels. For example, an EFI level may exist below an operating system level and a user level. The EFI level may be programmed to operate at a time before an operating system has been loaded, which may be referred to as a pre-boot time. An operating system level may exist between the EFI level and the user level. The operating system may facilitate user level logics interacting with system resources, and so on. A user level may exist above the operating system and EFI level. Typically a user level logic would not communicate, directly and/or indirectly, with an EFI level logic. Additionally, EFI operations are conventionally performed from an EFI shell and not from a user level logic.

The first signal may be received from a user level logic configured to operate at a post-boot time with operating system support. The first signal may be an indication to manipulate a persistent memory operably connected to a system configured with the EFI level logic and the user level logic. In one example, the first signal may be provided to the EFI level logic by the user level logic through an EFI variable. EFI variables may be visible to user level logics, operating system processes, EFI level logics, and so on, thus making them candidates for transferring information between the various levels. Information that may be transferred between the user level logic and the EFI level logic by the first signal may include, for example, an identifier of a first system firmware stored in a persistent memory to be manipulated, an identifier of a second system firmware to replace the first system firmware, an identifier of a persistent memory to manipulate, an identifier of an extensible firmware interface (EFI) level pre-boot process to employ to manipulate the persistent memory, and an identifier of a location of the second system firmware. Thus, the user level logic may specify that a certain version of an update process is to be tasked with replacing an existing BIOS in a certain persistent memory with a replacement BIOS stored somewhere on a computing system. Therefore it is to be appreciated that various examples of the example systems and methods described herein may be employed in computing system configurations including, but not limited to, single processor/single persistent memory/single BIOS systems, multiple processor/multiple persistent memory/multiple BIOS systems, and so on.

The persistent memory may be configured to store a system firmware like a BIOS. Thus, a user level logic may examine a system firmware stored in the persistent memory and determine that a newer version is desired and should be installed. Rather than undertaking conventional actions like pulling the chip or using an EFI shell approach to update the system firmware, the user level logic may communicate information designed to control the EFI level logic to automatically manipulate (e.g., replace) the existing system firmware with a newer version of the system firmware.

Thus, method 300 may include, at 310, selectively manipulating, from the EFI level logic, the persistent memory. Example actions associated with manipulating the persistent memory are described in connection with FIGS. 7 and 8.

Method 300 may also include, at 320, providing, from the EFI level logic, to the user level logic, a second signal concerning the manipulating of the persistent memory. The second signal may be, for example, an error code, a success code, a code that identifies the current system firmware that was installed in the persistent memory, and so on. Thus, information typically provided to an EFI shell layer may be made available to a user level logic. Like the first signal may be provided form the user level logic to the EFI level logic through an EFI variable, the second signal may also be provided to the user level logic from the EFI level logic through an EFI variable.

In one example, methodologies are implemented as processor executable instructions and/or operations provided on a computer-readable medium. Thus, in one example, a computer-readable medium may store processor executable instructions operable to perform a method that includes receiving, in an EFI level logic configured to run at a pre-boot time without operating system support, from a user level logic configured to run at a post-boot time with operating system support, through an EFI variable, a first signal to manipulate a flash memory operably connected to a system configured with the EFI level logic and the user level logic. The first signal may include data including, but not limited to, for example, an identifier of a first BIOS stored in a flash memory, an identifier of a second BIOS to replace the first BIOS, an identifier of a flash memory to manipulate, an identifier of an EFI level process to employ to manipulate the flash memory, and an identifier of a location of the second BIOS. The method may also include selectively manipulating the flash memory from the EFI level and, in response to manipulating the flash memory, providing, from the EFI level logic, to the user level logic, through an EFI variable, a second signal concerning the manipulating of the flash memory. In view of the various and alternative processes of method 300 described above, it will be appreciated that one embodiment of method 300 may include receiving, in an extensible firmware interface (EFI) level logic configured to operate at a pre-boot time without operating system support, from a user level logic configured to operate at a post-boot time with operating system support, a first signal to manipulate a persistent memory operably connected to a system configured with the EFI level logic and the user level logic, the persistent memory being configured to store a system firmware; selectively manipulating 310, from the EFI level logic, the persistent memory; and providing 320, from the EFI level logic, to the user level logic, a second signal concerning the manipulating of the persistent memory. Another embodiment of method 300 may include receiving, in an extensible firmware interface (EFI) level logic configured to run at a pre-boot time without operating system support, from a user level logic configured to run at a post-boot time with operating system support, through an EFI variable, a first signal to manipulate a flash memory operably connected to a system configured with the EFI level logic and the user level logic, the first signal including one or more of, an identifier of a first Basic Input Output System (BIOS) stored in a flash memory, an identifier of a second BIOS to replace the first BIOS, an identifier of a flash memory to manipulate, an identifier of an EFI level process to employ to manipulate the flash memory, and an identifier of a location of the second BIOS; selectively manipulating 310 the flash memory from the EFI level logic; and providing 320, from the EFI level logic, to the user level logic, through an EFI variable, a second signal concerning the manipulating of the flash memory.

While the above method is described being provided on a computer-readable medium, it is to be appreciated that other example methods described herein can also be provided on a computer-readable medium.

Figure 4:
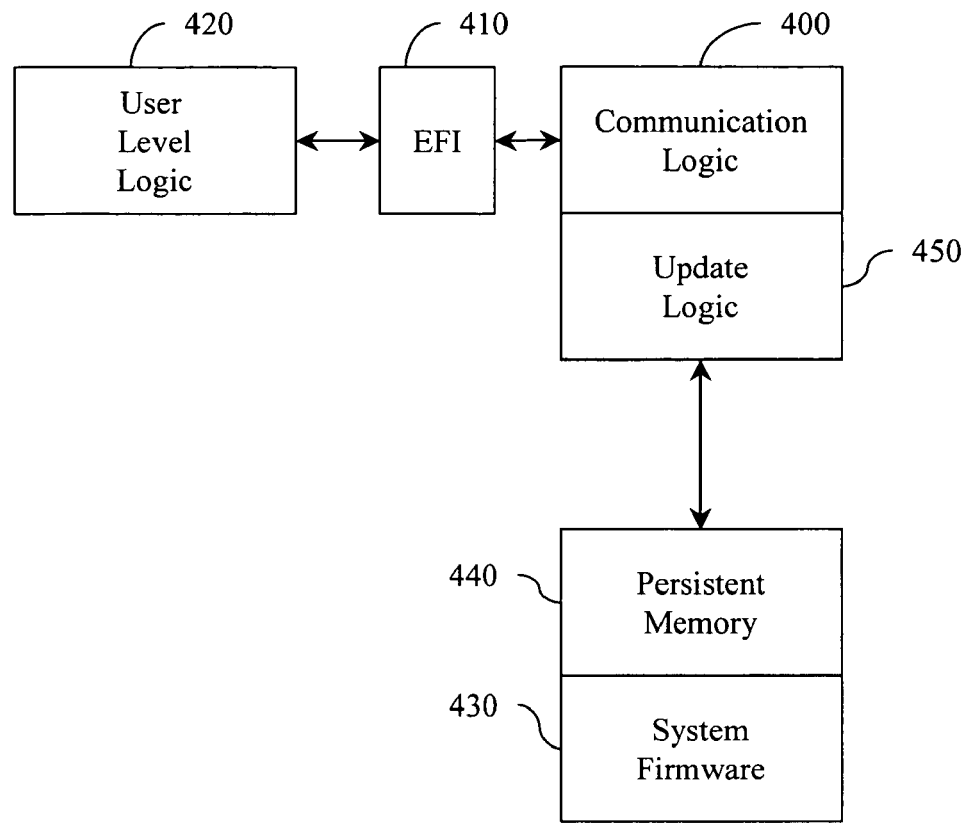
FIG. 4 illustrates an example system associated with manipulating a persistent memory.

FIG. 4 illustrates an example system associated with manipulating a persistent memory 440 configured to store a system firmware 430, where the manipulating may be performed by an EFI process. The system may include a communication logic 400 that is configured to receive a request to manipulate persistent memory 440. The persistent memory 440 may be, for example, an EEPROM, a flash memory, and so on. The system firmware 430 may be, for example a BIOS.

The communication logic 400 may be configured to receive the signal through an EFI 410. The signal may be received from a user level logic 420 that is configured to run at a post-boot time with operating system support. In one example, the user level logic 420 may be configured to run automatically, without the input of user, thus facilitating remote updating of systems. In another example the user level logic 420 may present a graphical user interface to a user displaying information like information about a BIOS currently installed in the system, information about a BIOS that is available to replace the currently installed BIOS, and so on. Thus, the system may facilitate online and/or telephone based support for less sophisticated users.

The communication logic 400 may also be configured to provide a response to the user level logic 420 concerning the manipulation of the persistent memory 440. For example, the communication logic 400 may report on the success/failure of an update of the system firmware 430.

The system may also include an update logic 450 that is operably connected to the communication logic 400. The update logic 450 may be configured to selectively manipulate the persistent memory 440 as part of an EFI pre-boot process. For example, when a system is booted, a mounted EFI partition may provide various pre-boot processes that can run before an operating system is loaded. One of these pre-boot processes may interact with the update logic 450 and be tasked with manipulating persistent memory 440. For example, a system firmware 430 stored in persistent memory 440 may be replaced by a more up-to-date firmware.

Figure 5:
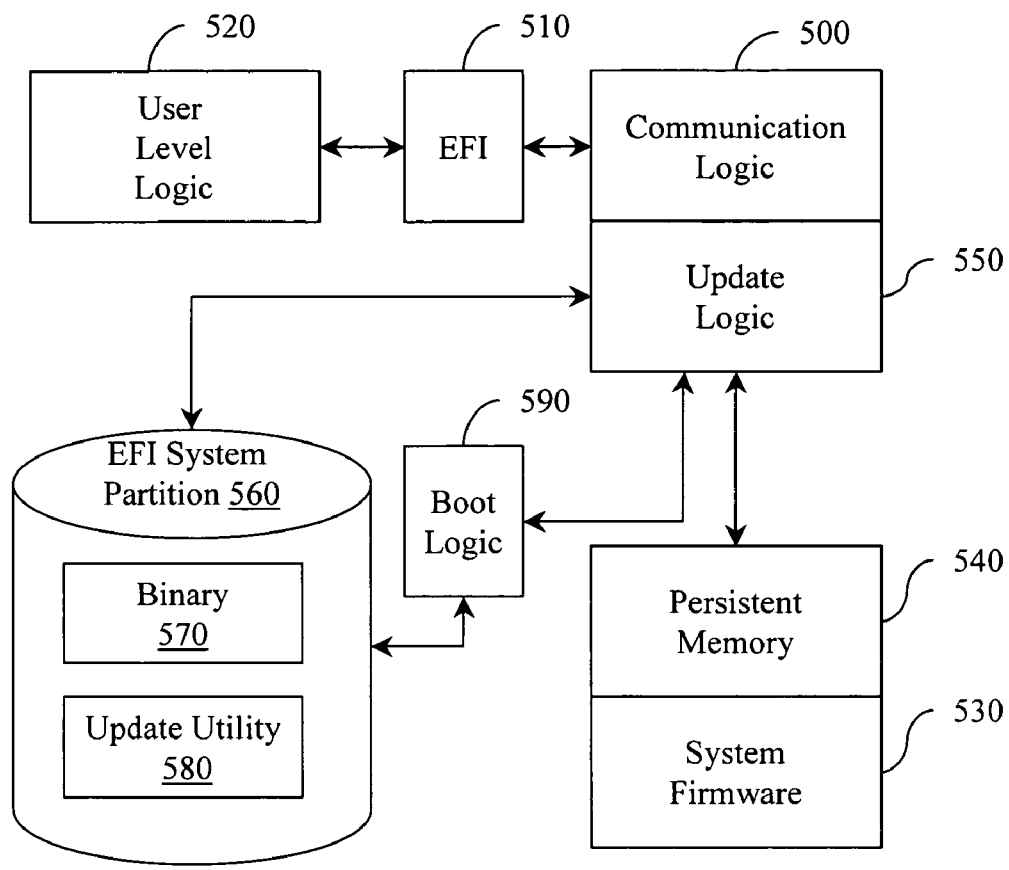
FIG. 5 illustrates an example system for manipulating a persistent memory.

FIG. 5 illustrates an example system for manipulating a persistent memory 540 that is configured with a system firmware 530. In one example the manipulating involves using an EFI 510. Like the system described in FIG. 4, the system illustrated in FIG. 5 may include an EFI level communication logic 500 and an EFI level update logic 550. The communication logic 500 may receive signals from a user level logic 520 via the EFI 510. Similarly, the communication logic 500 may send signals to the user level logic 520 via the EFI 510.

In addition to these elements, the system may also include a mountable EFI system partition 560 that is accessible to the update logic 550. The mountable EFI system partition 560 may be mounted in a computing system so that when a system reset occurs, the EFI system partition 560 is booted rather than an operating system partition. Therefore, executables associated with the EFI system partition 560 may get an opportunity to run during pre-boot time, before an operating system is loaded. This may facilitate, for example, replacing system firmware 530 stored in persistent memory 540.

The mountable EFI system partition 560 may be configured to store an item like a digital image of a replacement system firmware. The digital image of a firmware may be referred to as a binary, and is illustrated as binary 570. The EFI system partition 560 may also store an item like an executable image of an update process. An executable image of a process may be referred to as a utility, and is illustrated as update utility 580.

To facilitate communications between the communication logic 500 and the user level logic 520, the EFI 510 may include a set of EFI variables (not illustrated) that are visible to both the communication logic 500 and the user level logic 520. Thus information concerning which persistent memory to manipulate, which version of a BIOS to store in the selected persistent memory, which update logic to use to perform the update, and so on may be communicated from the user level logic 520 to the EFI level logics (communication logic 500, update logic 550) through EFI variables associated with EFI 510.

The system may also include a boot logic 590 that is configured to selectively invoke an EFI pre-boot process that is resident on the mountable EFI system partition 560. The boot logic 590 may receive control of a computing system upon assertion of a power good signal from a computing system power supply and thus may facilitate mounting EFI system partition 560 and using update logic 550 to reprogram persistent memory 540. A pre-boot process may, for example, manipulate EFI variables, invoke the update logic 550 to manipulate the persistent memory 540, and so on. By way of illustration, the update logic 550 may be configured to employ the update utility 580 to perform the manipulation of the persistent memory 540 by replacing system firmware 530 with the binary 570. The binary 570 may be, for example, a BIOS. The persistent memory 540 may be, for example, a flash memory.

Figure 6:
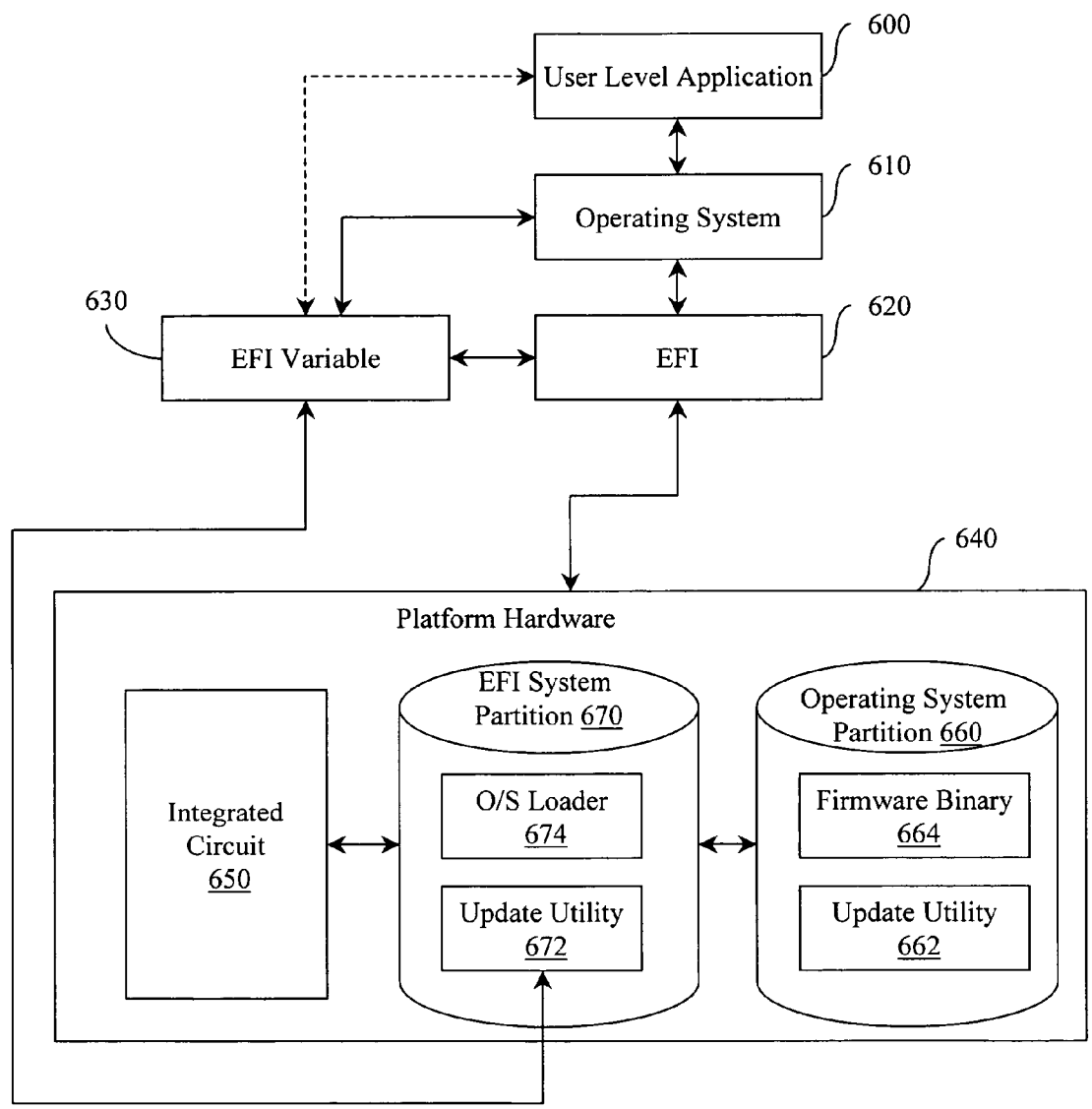
FIG. 6 illustrates another example system for manipulating a persistent memory.

FIG. 6 illustrates another example system for refreshing system firmware using an EFI. The system includes an integrated circuit 650 configured to store a system level firmware. The integrated circuit 650 may be, for example, an EEPROM, a flash memory, and the like. The system level firmware may be, for example, a control program, a power on self test program, an inventory program, a BIOS, and so on.

The system may include a first logic like a user level application 600 that is configured to determine whether to request an update of the system level firmware. If the user level application 600 determines that an update is to be requested, then the user level application 600 may request the update. Requesting the update may include, for example, communicating data through an operating system 610 and an EFI 620 to executables associated with a platform hardware 640 using, for example, an EFI variable 630.

The system may include an update logic like an update utility 672 that is configured to facilitate updating the system level firmware in response to the request from the user level application 600. The update utility 672 may be accessible from a pre-boot application like those associated with a mountable EFI system partition 670. In some examples different update utilities may be employed to perform different system firmware upgrades. Thus, update utility 672 may be copied, for example, from an operating system partition 660 that stores various executables like update utility 662.

In addition to storing the update utility 672, the mountable EFI partition 670 may store, for example, an operating system loader 674. Thus, when a user level application 600 requests a system firmware update, an update utility 672 may be run at a system reset. However, if a user level application 600 has not requested a system firmware update, an operating system loader 674 may be run to facilitate booting an operating system associated with operating system partition 660. The decision to run the update utility 672 instead of the operating system loader 674 may depend, at least in part, on a value stored in an EFI variable. For example, the EFI variable BootNext may be programmed with the address of a pre-boot executable to run during processing performed during a pre-boot EFI time.

The mountable EFI partition 670 may also store a binary image of a replacement firmware. Thus, the update logic may, at a pre-boot time, update firmware stored in integrated circuit 650 by replacing the firmware with the binary image stored in the EFI system partition 670. Different update requests from the user level application 600 may lead to different firmware binaries being copied to the integrated circuit 650. Thus, the operating system partition 660 may store various firmware binaries 664 that can be copied to the EFI system partition 670.

While a single EFI system partition 670 and a single operating system partition 660 are illustrated, it is to be appreciated that systems may include multiple partitions. Similarly, while a single integrated circuit 650 and a single user level application 600 are illustrated, it is to be appreciated that multiple integrated circuits could be manipulated in response to requests from multiple user level applications.

FIG. 7 illustrates an example method 700 associated with manipulating a persistent memory. Manipulating the persistent memory may include, for example, refreshing a system firmware stored in the persistent memory. The manipulation may include, for example, using an EFI to communicate data, invoke pre-boot processes, load binaries, and so on.

Method 700 may include, at 710, receiving a signal to manipulate a persistent memory. The signal may be received, for example, from a user level application. In one example, the signal may be received as the result of a user indicating an action through a graphical user interface.

Method 700 may also include, at 720, mounting a bootable EFI partition into a system configured with a user level logic, an EFI system, and a reprogrammable persistent memory like an EEPROM or flash memory. Mounting the EFI partition may make the EFI partition bootable on a subsequent reset of the system.

Method 700 may also include, at 730, copying an executable associated with performing a manipulation process from an operating system partition mounted in the system to the mounted EFI partition. For example, the executable may be a refresh tool configured to facilitate copying a binary from the EFI partition to the persistent memory to be manipulated. In one example, the refresh tool may include a binary version of the second system firmware. In another example, the refresh tool may include information concerning where a binary version of the second system firmware may be retrieved.

Method 700 may also include, at 740, updating an EFI variable like the BootNext variable to indicate that the refresh tool should be executed from the mounted EFI partition on the next reset of the system. Thus, the signal received from the user level application may have caused the system to be reconfigured so that EFI pre-boot activities will occur. One of these activities may be running the refresh tool instead of running an operating system loader.

Having mounted the EFI partition and reconfigured the system to run the refresh utility, method 700 may include, at 750, rebooting the system so that the EFI partition will be mounted and the refresh tool will be executed. Therefore, at 760, the EFI system is booted, and at 770, the refresh tool is run. More generally, the refresh tool may be referred to as the manipulation process. As described above, manipulation may include erasing, reprogramming, editing, and so on, firmware stored in a persistent memory. Thus, method 700 may include, as part of the actions at 770, copying a binary of the second system firmware to the persistent memory. Persistent memories may require different actions to be erased, written, rewritten, edited, and so on. Thus, in one example, copying a binary of the second system firmware to the persistent memory may include reconfiguring the persistent memory to be writeable, writing the binary to the persistent memory, and reconfiguring the persistent memory to be not writeable.

The copying may proceed normally, in which case the EFI system may wish to inform the user level application from which the initiating signal was received of the success. Alternatively, the copying may not proceed successfully, in which case the EFI system may wish to inform the user level application of an error. Therefore, running the refresh tool at 770 may include storing an error code in an EFI variable, where the error code concerns the status of copying the binary to the persistent memory.

Having performed the manipulation, the system may once again be rebooted. In one example, since the EFI system was booted and followed a pointer located in the BootNext variable to the refresh utility, that pointer may now be stale, and thus not followed on a subsequent reboot. This facilitates the EFI running an operating system loader on the subsequent reboot.

Therefore, method 700 may include, at 790, rebooting the system. Rebooting the system may include restarting the user level application that provided the initiating signal received at 710. Thus, method 700 may include, at 799, providing a signal to the user level application. The signal may include, for example, the success/error code, a pointer to an EFI variable storing the success/error code, updated firmware information, and so on.

In view of the above, it will be appreciated that one embodiment of method 700 may include receiving 710, in an extensible firmware interface (EFI) level logic configured to run at a pre-boot time without operating system support, from a user level logic configured to run at a post-boot time with operating system support, through an EFI variable, a first signal to manipulate a flash memory operably connected to a system configured with the EFI level logic and the user level logic, the first signal including one or more of, an identifier of a first Basic Input Output System (BIOS) stored in a flash memory, an identifier of a second BIOS to replace the first BIOS, an identifier of a flash memory to manipulate, an identifier of an EFI level process to employ to manipulate the flash memory, and an identifier of a location of the second BIOS; mounting 720 an extensible firmware interface (EFI) partition into the system; copying 730 an executable associated with performing a manipulation process from an operating system partition mounted in the system to the mounted EFI partition, where the executable includes a binary version of the second Basic Input Output System (BIOS); manipulating 740 an EFI BootNext variable to point to the copy of the executable on the mounted EFI partition; rebooting 750 the system; invoking the 770 manipulation process; copying a binary of the second BIOS to the flash memory, where copying a binary of the second BIOS to the flash memory includes: reconfiguring the flash memory to be writeable; writing the binary to the flash memory; and reconfiguring the flash memory to be not writeable; storing an error code in an EFI variable, where the error code concerns the status of copying the binary to the flash memory; rebooting 790 the system; and providing 799, from the EFI level logic, to the user level logic, through an EFI variable, a second signal concerning the manipulating of the flash memory.

The actions illustrated in method 700 may be one example of action 320 in method 300 (FIG. 3) described as manipulating persistent memory.

FIG. 8 illustrates an example method 800 associated with reflashing system firmware from an administrative level in an operating system. The method 800 includes, at 810, receiving a signal from a user level application. The signal may indicate that a certain system firmware is to be reflashed. Reflashing a system firmware may include reprogramming a flash memory with a new binary. Thus, at 820, a determination is made concerning whether the desired binary is available. If the determination is No, then processing may conclude, otherwise processing may continue at 830.

Method 800 may include, at 830, copying an update tool and a binary from a first location like an operating system partition to a second location like a mountable EFI system partition. Thus, pre-boot EFI processes may be able to execute the update tool at pre-boot time to copy the binary and thus reflash the system firmware.

Method 800 may include, at 840, updating an EFI by, for example, manipulating a pointer or record to facilitate locating and executing the update tool copied at 830. At 850, the system may be rebooted. Thus, the update tool copied to the mounted EFI system partition may be run which will cause, at 860, the system firmware (e.g., BIOS) to be reflashed.

Reflashing may or may not succeed. Thus, at 870 a determination is made concerning whether it succeeded. If the determination is No, then at 882 an error code may be established. This may include, for example, writing a value into an EFI variable visible to both the EFI system and user level applications. If the determination is Yes, then at 880 a success code may similarly be established.

Having attempted the reflash, at 890 the system may be rebooted, which in turn leads, at 892, to booting EFI. Since EFI already ran the update tool once, it will not run it on this reboot, but rather will proceed, at 894, to boot an operating system. Since a user level application took the action that started method 800, at 896 the user level application may be restarted. The use level application may then examine the success code established at 880 or the error code established at 882.

Figure 9:
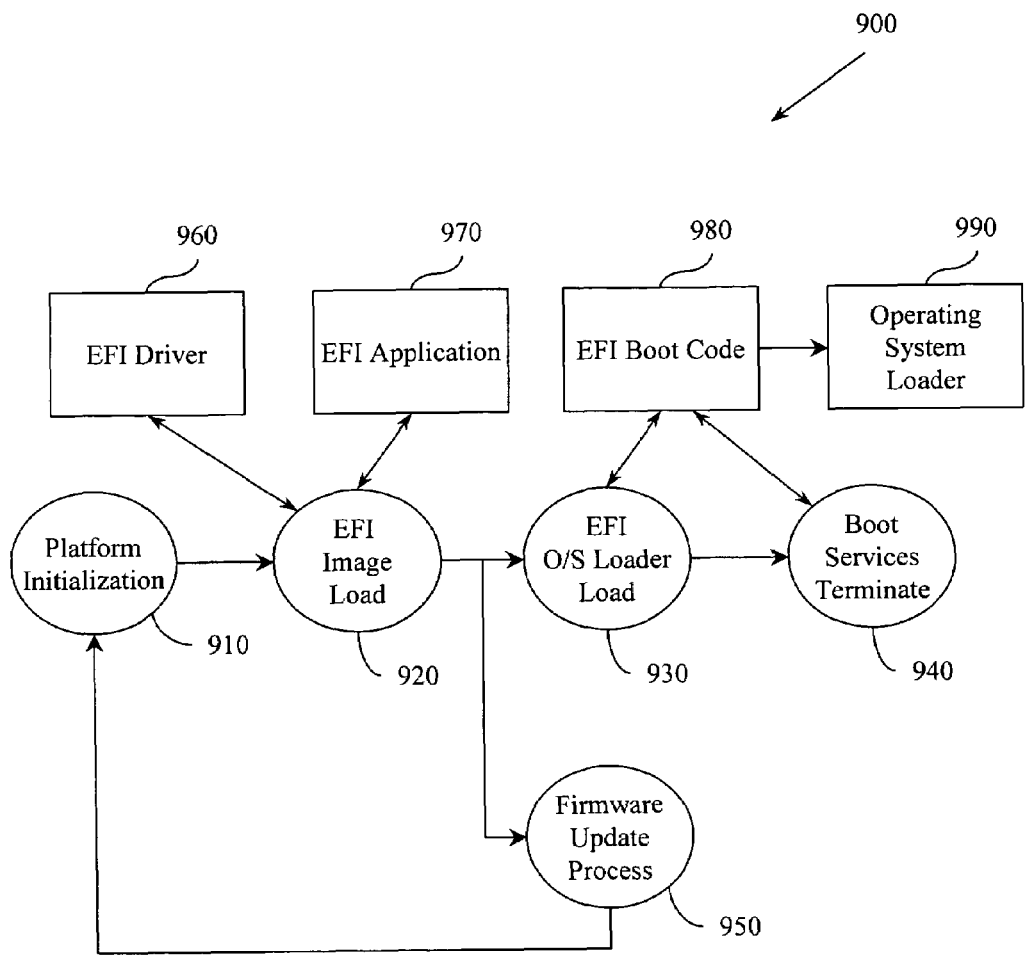
FIG. 9 illustrates a logic flow in an EFI enabled system.

FIG. 9 illustrates a logic flow 900 in an EFI enabled system. Platform initialization like detecting a reset signal or a PowerGood signal may occur at 910. At 920, an EFI image load may occur, which may include interacting with an EFI driver 960 and/or an EFI application 970. One EFI application 970 may be tasked with performing a firmware update process 950. Whether the logic flow proceeds to the firmware update process 950 or instead to an EFI operating system loader load process 930 may be determined, for example, by an address located in an EFI variable like the BootNext variable. If the logic flow proceeds to 950, then a new binary may be written to a persistent memory to provide, for example, a new BIOS to a system. If the logic flow proceeds to 930, then EFI boot code 980 may perform various pre-boot tasks.

In a non-firmware update process configuration, the logic flow 900 will proceed to the EFI operating system loader load process at 930, whereupon boot services will terminate at 940 and an operating system loader 990 will be invoked.

Figure 10:
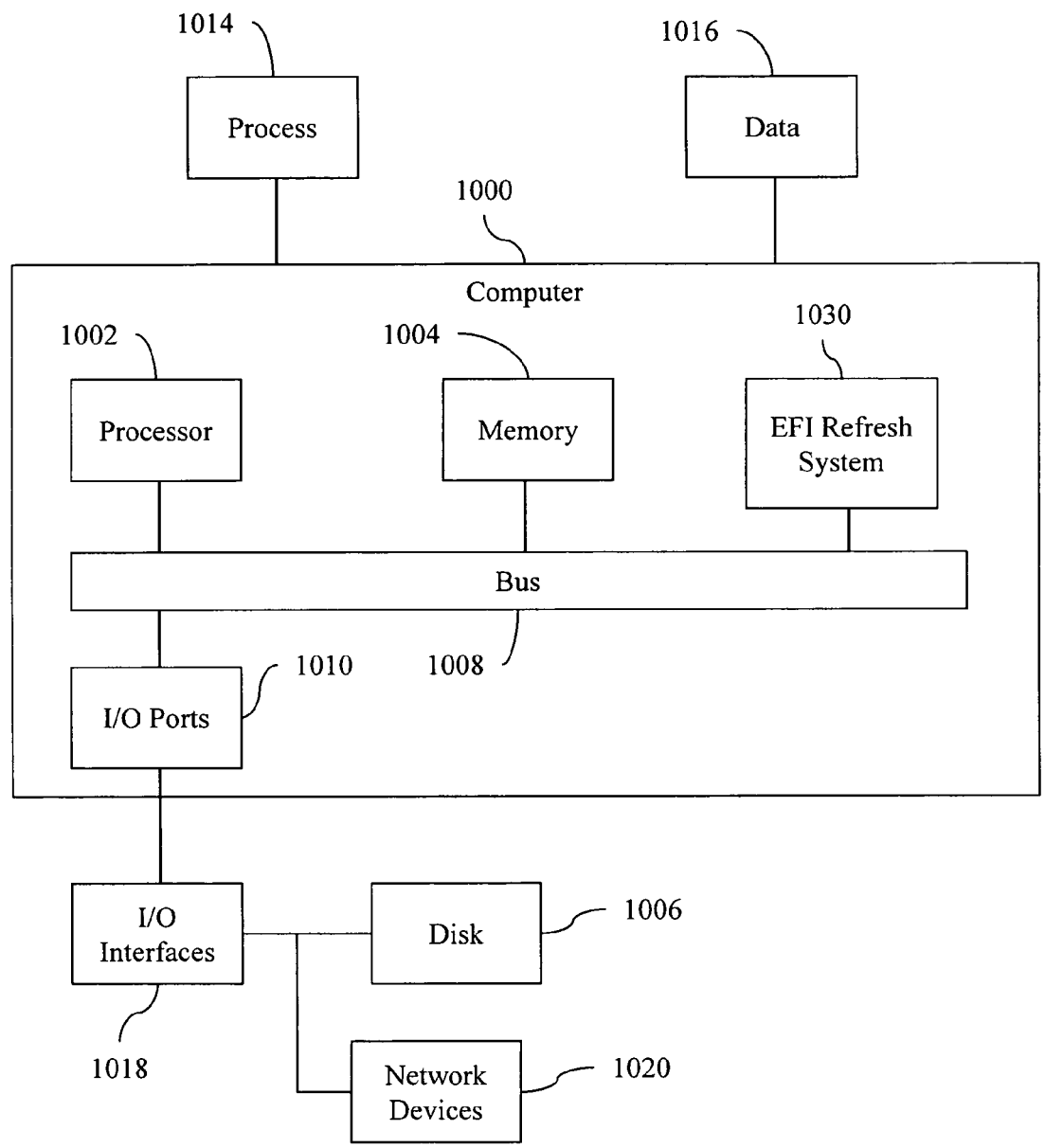
FIG. 10 illustrates an example computing environment in which example systems and methods illustrated herein can operate.

FIG. 10 illustrates a computer 1000 that includes a processor 1002, a memory 1004, and input/output ports 1010 operably connected by a bus 1008. In one example, the computer 1000 may include an EFI refresh system 1030 configured to facilitate manipulating a persistent memory and thus to refresh a system firmware. Thus, the EFI refresh system 1030, whether implemented in computer 1000 as hardware, firmware, software, and/or a combination thereof may provide means for communicating a configuration data between a user level application configured to run at a post-boot time with operating system support and an extensible firmware interface (EFI) pre-boot application configured to run without operating system support. The EFI refresh system 1030 may also provide means for selectively invoking a desired EFI pre-boot application and for performing a selective manipulation of a persistent memory configured to store a system level firmware. In one example, the selective manipulation may be performed by an EFI pre-boot update process configured as the desired EFI pre-boot application. The EFI pre-boot update process may manipulate the persistent memory based, at least in part, on the configuration data.

The processor 1002 can be a variety of various processors including dual microprocessor and other multi-processor architectures. The memory 1004 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 1006 may be operably connected to the computer 1000 via, for example, an input/output interface (e.g., card, device) 1018 and an input/output port 1010. The disk 1006 can include, but is not limited to, devices like a magnetic disk drive, a solid state disk drive, a floppy disk drive, a tape drive, a Zip drive, a flash memory card, and/or a memory stick. Furthermore, the disk 1006 can include optical drives like a CD-ROM, a CD recordable drive (CD-R drive), a CD rewriteable drive (CD-RW drive), and/or a digital video ROM drive (DVD ROM). The memory 1004 can store processes 1014 and/or data 1016, for example. The disk 1006 and/or memory 1004 can store an operating system that controls and allocates resources of the computer 1000.

The bus 1008 can be a single internal bus interconnect architecture and/or other bus or mesh architectures. While a single bus is illustrated, it is to be appreciated that computer 1000 may communicate with various devices, logics, and peripherals using other busses that are not illustrated (e.g., PCIE, SATA, Infiniband, 1394, USB, Ethernet). The bus 1008 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 1000 may interact with input/output devices via i/o interfaces 1018 and input/output ports 1010. Input/output devices can include, but are not limited to, a keyboard, a microphone, a pointing and selection device, cameras, video cards, displays, disk 1006, network devices 1020, and the like. The input/output ports 1010 can include but are not limited to, serial ports, parallel ports, and USB ports.

The computer 1000 can operate in a network environment and thus may be connected to network devices 1020 via the i/o interfaces 1018, and/or the i/o ports 1010. Through the network devices 1020, the computer 1000 may interact with a network. Through the network, the computer 1000 may be logically connected to remote computers. The networks with which the computer 1000 may interact include, but are not limited to, a local area network (LAN), a wide area network (WAN), and other networks. The network devices 1020 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 1020 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, and/or through a network may include combinations and mixtures of communications.

Figure 11:
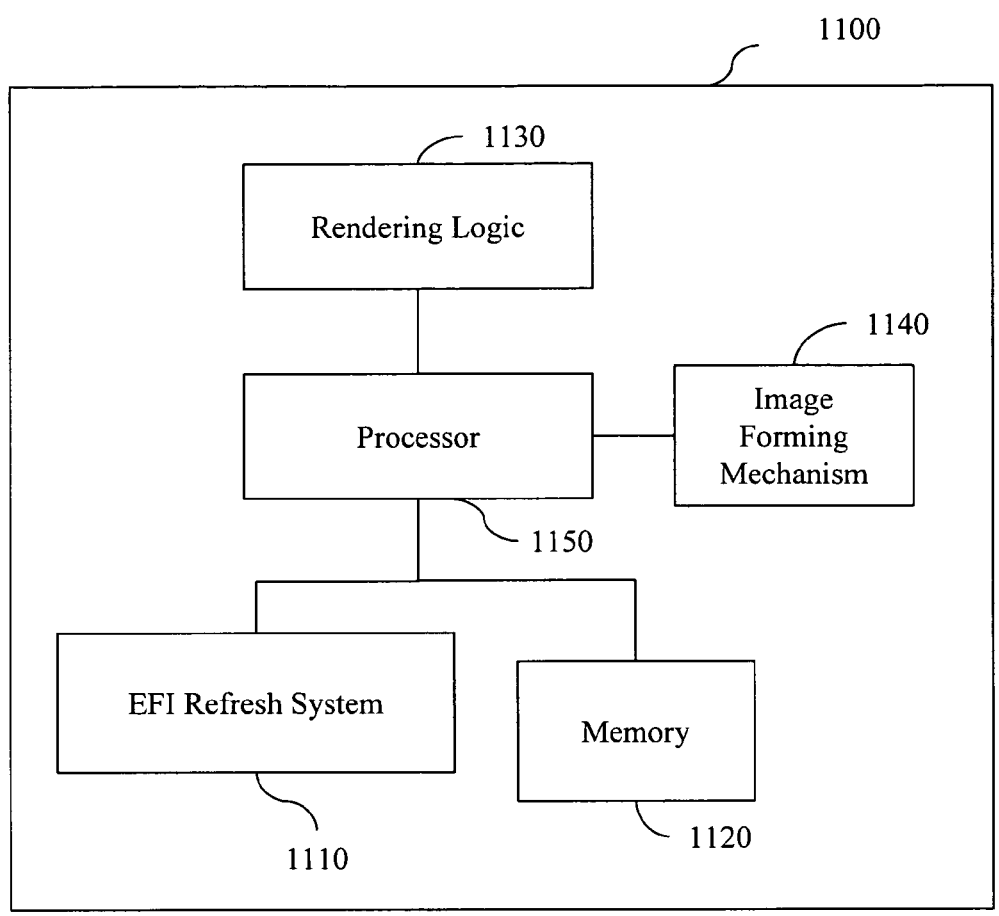
FIG. 11 illustrates an example image forming device in which example systems and methods illustrated herein can operate.

FIG. 11 illustrates an example image forming device 1100 that includes an EFI refresh system 1110 similar to the example systems described herein. The EFI refresh system 1110 may include a logic that is configured to perform the executable methods like those described herein. The EFI refresh system 1110 may be permanently and/or removably attached to the image forming device 1100.

The image forming device 1100 may receive print data to be rendered. Thus, image forming device 1100 may also include a memory 1120 configured to store print data or to be used more generally for image processing. The image forming device 1100 may also include a rendering logic 1130 configured to generate a printer-ready image from print data. Rendering varies based on the format of the data involved and the type of imaging device. In general, the rendering logic 1130 converts high-level data into a graphical image for display or printing (e.g., the print-ready image). For example, one form is ray-tracing that takes a mathematical model of a three-dimensional object or scene and converts it into a bitmap image. Another example is the process of converting HTML into an image for display/printing. It is to be appreciated that the image forming device 1100 may receive printer-ready data that does not need to be rendered and thus the rendering logic 1130 may not appear in some image forming devices.

The image forming device 1100 may also include an image forming mechanism 1140 configured to generate an image onto print media from the print-ready image. The image forming mechanism 1140 may vary based on the type of the imaging device 1100 and may include a laser imaging mechanism, other toner-based imaging mechanisms, an ink jet mechanism, digital imaging mechanism, or other imaging reproduction engine. A processor 1150 may be included that is implemented with logic to control the operation of the image-forming device 1100. In one example, the processor 1150 includes logic that is capable of executing Java instructions. Other components of the image forming device 1100 are not described herein but may include media handling and storage mechanisms, sensors, controllers, and other components involved in the imaging process.

Figure 12:
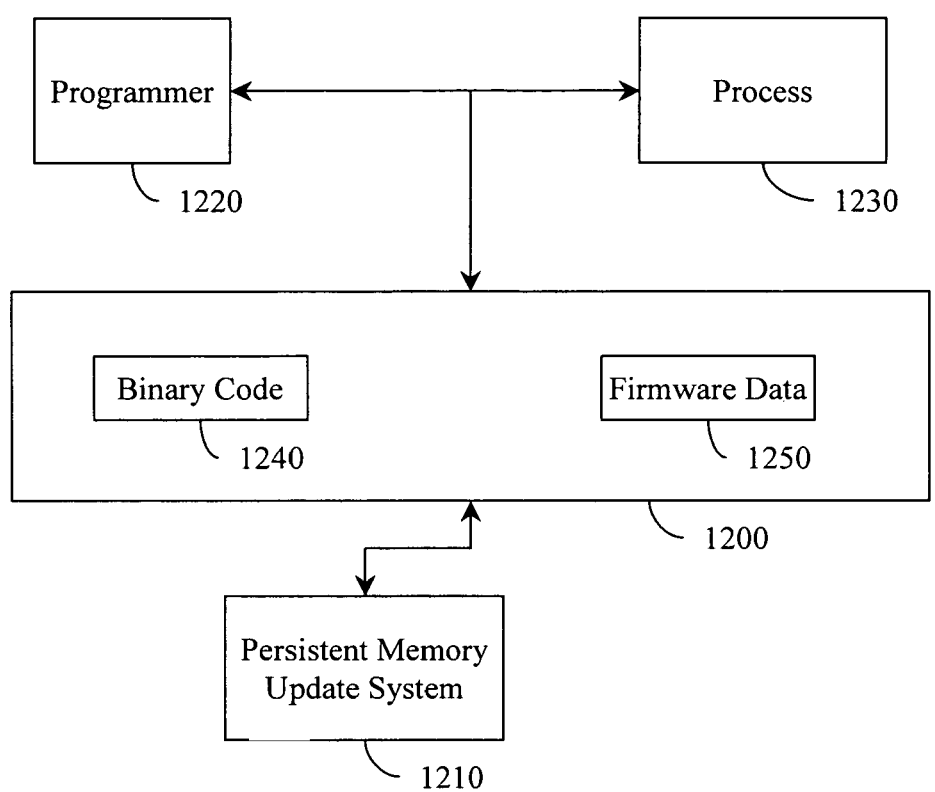
FIG. 12 illustrates an example application programming interface (API).

Referring now to FIG. 12, an application programming interface (API) 1200 is illustrated providing access to a system 1210 for manipulating a persistent memory configured with a system firmware. The API 1200 can be employed, for example, by a programmer 1220 and/or a process 1230 to gain access to processing performed by the system 1210. For example, a programmer 1220 can write a program to access the system 1210 (e.g., invoke its operation, monitor its operation, control its operation) where writing the program is facilitated by the presence of the API 1200. Rather than programmer 1220 having to understand the internals of the system 1210, the programmer 1220 merely has to learn the interface to the system 1210. This facilitates encapsulating the functionality of the system 1210 while exposing that functionality.

Similarly, the API 1200 can be employed to provide data values to the system 1210 and/or retrieve data values from the system 1210. For example, a process 1230 that examines binaries can provide binary code to the system 1210 via the API 1200 by, for example, using a call provided in the API 1200. Thus, in one example of the API 1200, a set of application programming interfaces can be stored on a computer-readable medium. The interfaces can be employed by a programmer, computer component, logic, and so on, to gain access to a system 1210 for manipulating a persistent memory configured with a system firmware. The interfaces can include, but are not limited to, a first interface 1240 that communicates a binary code (e.g., replacement system firmware) and a second interface 1250 that communicates a firmware data that may facilitate characterizing the binary code. For example, the firmware data may include size, version, date, and other identifying and/or characterizing data.

Figure 13:
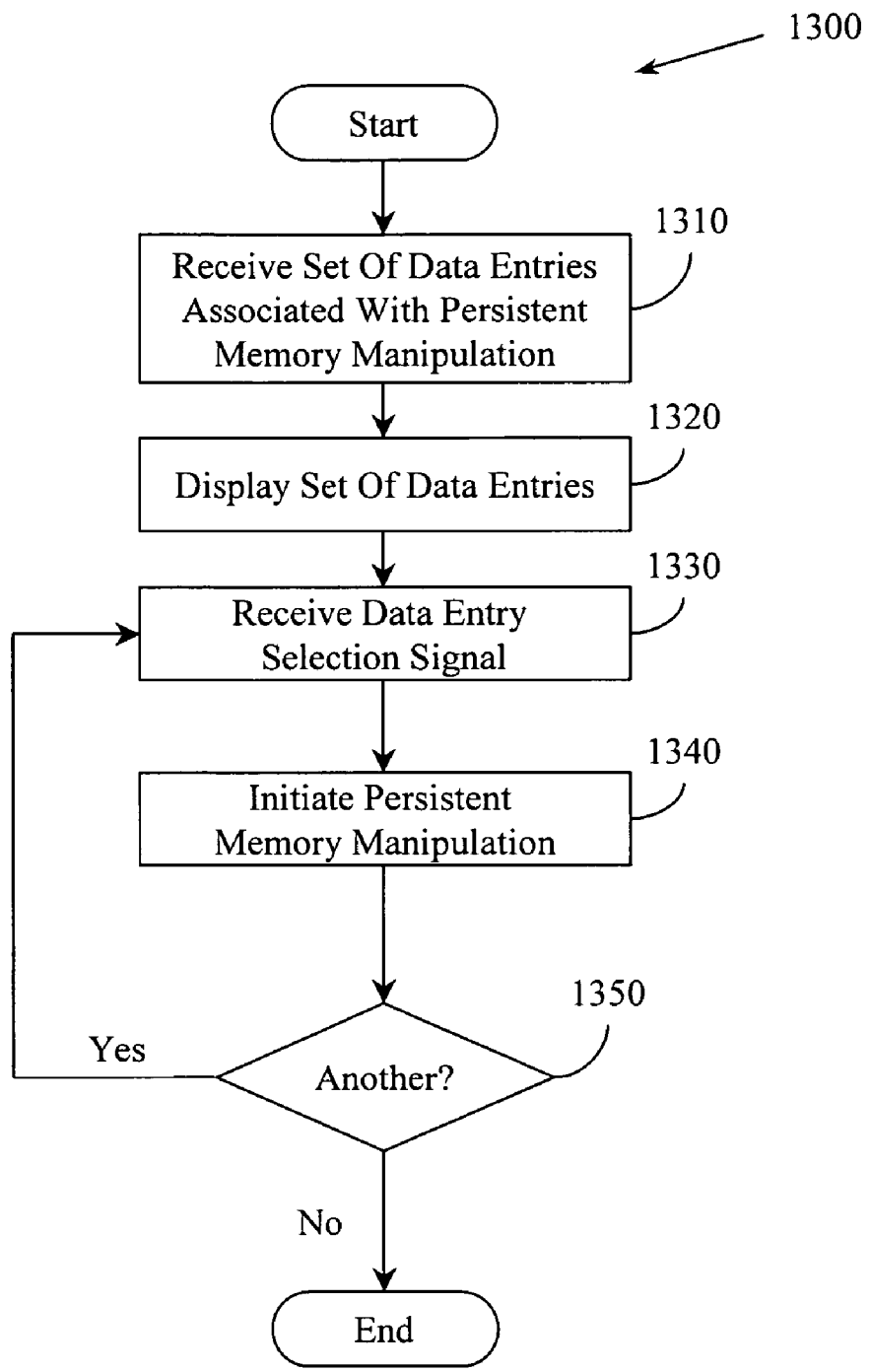
FIG. 13 illustrates an example method associated with a graphical user interface (GUI).

FIG. 13 illustrates an example method 1300 associated with persistent memory manipulations and a graphical user interface. The method 1300 may be performed in a computer system having a graphical user interface that includes a display and a selection device. The method 1300 may include providing and selecting from a set of data entries on the display. In one example, the method 1300 may include, at 1310, retrieving a set of data entries, where a data entry represents a persistent memory manipulation action operation like specifying that a persistent memory is to manipulated by replacing a system firmware stored therein, and the like. The method 1300 may also include, at 1320, displaying the set of data entries on the display and, at 1330, receiving a data entry selection signal indicative of the selection device selecting a selected data entry. The data entry selection signal may be received in response to, for example, a mouse click, a key press, a voice command, and so on. At 1340, in response to the data entry selection signal, the method 1300 may include initiating a persistent memory manipulation associated with the selected data entry, where the operation will be performed by an extensible firmware interface (EFI) pre-boot process. In one example, a determination is made at 1350 concerning whether another data entry selection signal is to be processed. If the determination is Yes, then processing returns to 1330, otherwise, method 1300 may complete.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A method, comprising:
   receiving, in an extensible firmware interface (EFI) level logic configured to operate at a pre-boot time without operating system support, from a user level logic configured to operate at a post-boot time with operating system support, a first signal to manipulate a persistent memory operably connected to a system configured with the EFI level logic and the user level logic, the persistent memory being configured to store a system firmware;
   selectively manipulating, from the EFI level logic, the persistent memory; and
   providing, from the EFI level logic, to the user level logic, a second signal concerning the manipulating of the persistent memory.

2. The method of claim 1, the first signal being provided to the extensible firmware interface (EFI) level logic by the user level logic through an EFI variable.

3. The method of claim 2, the second signal being provided to the user level logic from the extensible firmware interface (EFI) level logic through an EFI variable.

4. The method of claim 3, the first signal including one or more of, an identifier of a first system firmware stored in a persistent memory to be manipulated, an identifier of a second system firmware to replace the first system firmware, an identifier of a persistent memory to manipulate, an identifier of an extensible firmware interface (EFI) level pre-boat process to employ to manipulate the persistent memory, and an identifier of a location of the second system firmware.

5. The method of claim 1, the persistent memory comprising one of, a flash memory, and an EEPROM.

6. The method of claim 1, the system firmware comprising a Basic Input Output System (BIOS) configured to boot the system.

7. The method of claim 4, where selectively manipulating the persistent memory includes:
   mounting a bootable extensible firmware interface (EFI) partition into the system;
   copying an executable associated with performing a manipulation process from an operating system partition mounted in the system to the mounted EFI partition;
   rebooting the system;
   invoking the manipulation process;
   copying a binary of the second system firmware to the persistent memory;
   storing an error code in an EFI variable, where the error code concerns the status of copying the binary to the persistent memory; and
   rebooting the system.

8. The method of claim 7, where the executable associated with performing a manipulation process includes a binary version of the second system firmware.

9. The method of claim 7, including manipulating an extensible firmware interface (EFI) variable to point to the copy of the executable associated with the manipulation process on the mounted EFI partition.

10. The method of claim 8, the extensible firmware interface (EFI) variable being the BootNext variable.

11. The method of claim 7, where copying a binary of the second system firmware to the persistent memory includes:
   reconfiguring the persistent memory to be writeable;
   writing the binary to the persistent memory; and
   reconfiguring the persistent memory to be not writeable.

12. A method, comprising:
receiving, in an extensible firmware Interface (EFI) level logic configured to run at a pre-boot time without operating system support, from a user level logic configured to run at a post-boot time with operating system support, through an EFI variable, a first signal to manipulate a flash memory operably connected to a system configured with, the EFI level logic and the user level logic, the first signal including one or more of, an identifier of a first Basic Input Output System (BIOS) stored in a flash memory, an Identifier of a second BIOS to replace the first BIOS, an identifier of a flash memory to manipulate, an identifier of an EFI level process to employ to manipulate the flash memory, and an identifier of a location of the second BIOS;
selectively manipulating the flash memory from the EFI level logic; and
providing, from the EFI level logic, to the user level logic, through an EFI, variable, a second signal concerning the manipulating of the flash memory.

13. A method, comprising:
receiving, in an extensible firmware interface (EFI) level logic configured to run at a pre-boot time without operating system support, from a user level logic configured to run at a post-boot time with operating system support, through an EFI variable, a first signal to manipulate a flash memory operably connected to a system configured with the EFI level logic and the user level logic, the first signal including one or more of, an identifier of a first Basic Input Output System (BIOS) stored in a flash memory, an identifier of a second BIOS to replace the first BIOS, an identifier of a flash memory to manipulate, an identifier of an EFI level process to employ to manipulate the flash, memory, and an identifier of a location of the second BIOS;
mounting an extensible firmware interface (EFI) partition into the system;
copying an executable associated with performing a manipulation process from an operating system partition mounted in the system to the mounted EFI partition, where the executable includes a binary version of the second Basic Input Output System (BIOS);
manipulating an EFI BootNext variable to point to the copy of the executable on the mounted EFI partition;
rebooting the system;
invoking the manipulation process;
copying a binary of the second BIOS to the flash memory, whew copying a binary of the second BIOS to the flash memory includes:
reconfiguring the flash memory to be writeable;
writing the binary to the flash memory; and
reconfiguring the flash memory to be not writeable;
storing an error code in an EFI variable, where the error code concerns the status of copying the binary to the flash memory;
rebooting the system; and
providing, from the EFI level logic, to the user level logic, through an EFI variable, a second signal concerning the manipulating of the flash memory.

14. A computer-readable medium storing processor executable instructions operable to perform a method, the method comprising:
receiving, in an extensible firmware interface (EFI) level logic configured to run at a pre-boot time without operating system support, from a user level logic configured to run at a post-boot time with operating system support, through an EFI variable, a first signal to manipulate a flash memory operably connected to a system configured with the EFI level logic and the user level logic, the first signal including one or more of, an identifier of a first Basic Input Output System (BIOS) stored in a flash memory, an identifier of a second BIOS to replace the first BIOS, an identifier of a flash memory to manipulate, an identifier of an EFI level process to employ to manipulate the flash memory, and an identifier of a location of the second BIOS;
selectively manipulating the flash memory from the EFI level; and
providing, from the EFI level logic, to the user level logic, through an EFI variable, a second signal concerning the refreshing of the flash memory.

15. A system, comprising:
a communication logic configured to receive, through an extensible firmware interface (EFI), from a user level logic configured to run at a post-boot time with operating system support, a request for a manipulation of a persistent memory configured to store a system firmware, the communication logic also being configured to provide a response to the user level logic concerning the manipulation; and
an update logic operably connected to the communication logic, the update logic being configured to selectively manipulate the persistent memory as part of an EFI pre-boot process.

16. The system of claim 15, including:
a mountable extensible firmware interface (EFI) system partition accessible to the update logic;
a set of EFI variables visible to the communication logic and the user level logic; and
a boot logic configured to selectively invoke one or more EFI pre-boot processes resident on the mountable system partition, where a pre-boot process may manipulate one or more members of the set of EFI variables and may Invoke the update logic to manipulate the persistent memory.

17. The system of claim 16, the mountable extensible firmware interface (EFI) system partition being configured to store a digital image of a replacement system firmware and an executable image of an update process, the update logic being configured to employ the executable image of the update process to perform the manipulation of the persistent memory.

18. The system of claim 15, the system firmware being a Basic Input Output System (BIOS) configured to boot a computing system.

19. The system of claim 15, the persistent memory being a flash memory.

20. A system, comprising:
a communication logic configured to receive, through an extensible firmware interface (EFI), from a user level logic configured to run at a post-boot time with operating system support, a request for a manipulation of a flash memory configured to store a Basic Input Output System (BIOS), the communication logic also being configured to provide a response to the user level logic concerning the manipulation of the flash memory;
an update logic operably connected to the communication logic, the update logic being configured to selectively manipulate the flash memory as part of an EFI pre-boot process;
a mountable EFI system partition accessible to the update logic, the EFI system partition being configured to store a digital image of a replacement BIOS and an executable image of an update process, where the update logic may employ the executable image of the update process to perform the manipulation of the flash memory;

a set of EFI variables visible to the communication logic and the user level logic; and a boot logic configured to selectively invoke one or more EFI pre-boot processes resident on the mountable system partition, where a pre-boot process may manipulate one or more members of the set of EFI variables and may invoke the update logic to manipulate the flash memory.

21. A system, comprising:

an integrated circuit configured to store a system level firmware;

a first logic configured to determine whether to request an update of the system level firmware, the first logic being accessible from a user application, the first logic being configured to request an update of the system level firmware;

an update logic configured to facilitate updating the system level firmware in response to the request from the first logic, the update logic being accessible from a pre-boot application;

an extensible firmware interface (EFI) logic configured to facilitate invoking a function performable by the update logic, the first logic being configured to communicate a configuration data with the update logic through an EFI variable; and a mountable EFI partition configured to store one or more executables associated with a function performable by the update logic and a binary image of a replacement firmware, where the update logic may, at a pre-boot time, perform the update of the firmware by replacing one or more portions of the firmware with one or more portions of the binary image of the replacement firmware.

22. The system of claim 21, the firmware being a Basic Input Output System (BIOS) configured to boot a computing system.

23. The system of claim 21, the integrated circuit being one of, an EEPROM, and a flash memory.

24. The system of claim 21, including:

an operating system partition configured to store one or more executables associated with a function performable by the update logic, where the one or more executables may be copied to the mountable extensible firmware interface (EFI) partition, the operating system partition also being configured to store one or more binary images of replacement firmwares, where the one or more binary images may be copied to the mountable EFI partition as the replacement firmware.

25. A system, comprising:

a flash memory configured to store a Basic Input Output System (BIOS);

a first logic configured to determine whether to request an update of the BIOS, the first logic being accessible from a user application;

an update logic configured to facilitate updating the BIOS, the update logic being accessible from a pre-boot application;

an extensible firmware interface (EFI) logic configured to facilitate invoking a function performable by the update logic, the first logic being configured to communicate a configuration data with the update logic through an EFI variable;

a mountable EFI partition configured to store one or more executables associated with a function performable by the update logic and a binary image of a replacement BIOS, where the update logic may, at a pre-boot time, perform the update of the BIOS by replacing one or more portions of the BIOS with one or more portions of the binary image of the replacement BIOS; and an operating system partition configured to store one or more executables associated with a function performable by the update logic, where the one or more executables may be copied to the mountable EFI partition, the operating system partition also being configured to store one or more binary images of replacement BIOSs that may be copied to the mountable EFI partition as the replacement BIOS.

26. A system, comprising:

means for communicating a configuration data between a user level application configured to run at a post-boot time with operating system support and an extensible firmware interface (EFI) pre-boot application;

means for selectively invoking a desired EFI pre-boot application; and means for performing a selective manipulation of a persistent memory configured to store a system level firmware, where the selective manipulation is performed by an EFI pre-boot update process configured as the desired EFI pre-boot application, and where the EFI pre-boot update process manipulates the persistent memory based, at least in part, on the configuration data.

27. A set of application programming interfaces embodied on a computer-readable medium for execution by a computer component in conjunction with replacing a system firmware using an extensible firmware interface (EFI) where the replacement is initiated at a user level, comprising:

a first Interface for communicating a binary code to replace the system firmware; and a second interface for communicating a system firmware data configured to characterize the binary code.

\* \* \* \* \*

UNITED STATES PATENT AND TRADEMARK OFFICE
CERTIFICATE OF CORRECTION

PATENT NO. : 7,574,593 B2
APPLICATION NO. : 11/004355
DATED : August 11, 2009
INVENTOR(S) : John Brian Mayfield et al.

It is certified that error appears in the above-identified patent and that said Letters Patent is hereby corrected as shown below:

In column 16, line 31, in Claim 4, delete "pre-boat" and insert -- pre-boot --, therefor.

In column 17, line 2, in Claim 12, delete "Interface" and insert -- interface --, therefor.

In column 17, line 8, in Claim 12, delete "with," and insert -- with --, therefor.

In column 17, line 11, in Claim 12, delete "Identifier" and insert -- identifier --, therefor.

In column 17, line 19, in Claim 12, delete "EFI," and insert -- EFI --, therefor.

In column 17, line 34, in Claim 13, delete "flash," and insert -- flash --, therefor.

In column 17, line 48, in Claim 13, delete "whew" and insert -- where --, therefor.

In column 18, line 36, in Claim 16, delete "Invoke" and insert -- invoke --, therefor.

In column 19, lines 3-4, in Claim 20, delete "logicand" and insert -- logic and --, therefor.

In column 20, line 47, in Claim 27, delete "Interface" and insert -- interface --, therefor.

Signed and Sealed this

Sixth Day of April, 2010

David J. Kappos
*Director of the United States Patent and Trademark Office*